(12) United States Patent
Li et al.

(10) Patent No.: US 10,992,172 B2
(45) Date of Patent: Apr. 27, 2021

(54) POWER SUPPLY CIRCUIT

(71) Applicant: VOLTRONIC POWER TECHNOLOGY CORP., Taipei (TW)

(72) Inventors: Yizhao Li, Shenzhen (CN); Jianqun Wu, Guangdong (CN); Juor-Ming Hsieh, Taipei (TW)

(73) Assignee: VOLTRONIC POWER TECHNOLOGY CORP., Taipei (TW)

( * ) Notice: Subject to any disclaimer, the term of this patent is extended or adjusted under 35 U.S.C. 154(b) by 128 days.

(21) Appl. No.: 16/410,636

(22) Filed: May 13, 2019

(65) Prior Publication Data

US 2020/0235606 A1 Jul. 23, 2020

(30) Foreign Application Priority Data

Jan. 23, 2019 (CN) .......................... 201910063500.2

(51) Int. Cl.
*H02J 7/00* (2006.01)
*H02J 9/06* (2006.01)

(52) U.S. Cl.
CPC ............ *H02J 9/061* (2013.01); *H02J 7/0013* (2013.01)

(58) Field of Classification Search
CPC .... H02J 7/0013; H02J 7/02; H02J 9/00; H02J 9/061; H02J 9/062; H02M 3/158; H02M 7/12
USPC .................. 307/65–67, 77; 320/137; 363/37
See application file for complete search history.

(56) References Cited

U.S. PATENT DOCUMENTS

| | | | |
|---|---|---|---|
| 2006/0175904 A1* | 8/2006 | Powell | H02J 9/062 307/66 |
| 2013/0049699 A1* | 2/2013 | Jayaraman | H02M 5/458 320/137 |

* cited by examiner

*Primary Examiner* — Toan T Vu
(74) *Attorney, Agent, or Firm* — Li & Cai Intellectual Property (USA) Office

(57) ABSTRACT

An improved power supply circuit which includes a utility power source, a plurality of silicon controlled rectifiers (SCR1-SCR6), a first battery, a second battery, a first inductor, a second inductor, a first capacitor, a second capacitor and a plurality of power switch elements (Q1~Q4). When the utility power source is in a positive half cycle, the SCR1 and the SCR6 are turned on; the SCR2, the SCR3, the SCR4 and the SCR5 are turned off; the Q1 is activated to make the electrical energy directed to the first capacitor through the diode of the Q3, and the voltage on the first capacitor is maintained at a constant. Meanwhile, the Q2 is turned off, the Q4 is operated to let the current flow through the second inductor to charge the second battery.

9 Claims, 6 Drawing Sheets

US 10,992,172 B2

POWER SUPPLY CIRCUIT

CROSS-REFERENCE TO RELATED PATENT APPLICATION

This application claims the benefit of priority to China Patent Application No. 201910063500.2, filed on Jan. 23, 2019 in People's Republic of China. The entire content of the above identified application is incorporated herein by reference.

FIELD OF THE DISCLOSURE

The present disclosure is related to an improved power supply circuit, and in particular to a power supply circuit of a continuous electric power supply system (i.e., uninterruptible power supply, UPS) with two circuit topology architectures having unipolar single-battery and unipolar dual-battery, and functions of rectifying and charging.

BACKGROUND OF THE DISCLOSURE

In the field of power electronics, the circuit architecture of a UPS currently found on the market generally includes bipolar circuits. The first stage is a rectifier circuit (or a power factor correction circuit) and the second stage is a battery charging circuit, while the first stage is a front polar circuit and the second stage is a rear polar circuit.

In general, the first stage circuit has a function of power factor correction, by which a voltage on a capacitor at an output end of the first stage circuit is maintained at a stable voltage value. The existing circuit architecture of the second stage charging circuit is accomplished through the formation of a combination of two groups of buck circuits. However, in the charging circuit architecture of the UPS, when a larger charging current is required, inductors with a larger size need to be designed therefor, while relevant semiconductor devices with a larger capacity need to be selected therefor, which would inevitably increase the costs associated therewith. In addition, since a greater number of devices may be required, said costs may be further increased. Therefore, there is a need in the related art for improvement on the conventional power supply circuit.

SUMMARY OF THE DISCLOSURE

The present disclosure provides an improved power supply circuit, which can allow circuit devices to be fully utilized, as compared with the existing UPS power supply circuit. Using the alternating characteristic of waves of the positive and negative half cycles of the utility power source, a circuit topology architecture utilizing an idle half thereof is designed. To charge the architecture of a single-battery pack or dual-battery pack, the charging part of the circuit topology architecture and the power factor correction circuit of the topology architecture can share some of the circuit devices, so as to make full use of the circuit devices, and to achieve a larger charging current. Therefore, a higher efficiency can be achieved under the premise of an identical charging current, so that a more efficient use of energy and energy conservation with reduced carbon emissions are possible.

In one aspect, the present disclosure provides an improved power supply circuit, which is used in an uninterruptible power supply system for single-phase, two-phase or three-phase circuits, the improved power supply circuit including: a utility power source; a first silicon controlled rectifier (SCR), a first end of the first SCR being coupled to the utility power source; a third SCR, a second end of the third SCR being coupled to a second end of the first SCR; a fifth SCR, a first end of the fifth SCR being coupled to a second end of the third SCR, a second end of the fifth SCR being coupled to the first end of the third SCR; a first battery, a first end of the first battery being coupled to a first end of the third SCR; a first inductor, a first end of the first inductor being coupled to the first end of the fifth SCR; a first power switch element, the first end of the first power switch element being coupled to a second end of the first inductor, and a second end of the first power switch element being coupled to a second end of the first battery; a third power switch element, the second end of the third power switch element being coupled to the second end of the first inductor; a first capacitor, the first end of the first capacitor being coupled to a first end of the third power switch element, a second end of the first capacitor being coupled to the second end of the first battery; a second SCR, a second end of the second SCR being coupled to the utility power source; a fourth SCR, a first end of the fourth SCR being coupled to a first end of the second SCR; a sixth SCR, a first end of the sixth SCR being coupled to a second end of the fourth SCR, a second end of the sixth SCR being coupled to the first end of the fourth SCR; a second battery, a first end of the second battery being coupled to the second end of the first battery, a second end of the second battery being coupled to the second end of the fourth SCR; a second power switch element, a first end of the second power switch element being coupled to the first end of the second battery; a second capacitor, a first end of the second capacitor being coupled to the first end of the second battery; a fourth power switch element, a first end of the fourth power switch element being coupled to a second end of the second power switch element, and a second end of the fourth power switch element being coupled to a second end of the second capacitor; and a second inductor, a first end of the second inductor being coupled to the second end of the sixth SCR, and a second end of the second inductor being coupled to the second end of the second power switch element.

In another aspect, the present disclosure further provides an improved power supply circuit, which is used in an uninterruptible power supply (UPS) for single-phase, two-phase or three-phase circuits, the improved power supply circuit including: a utility power source; a first silicon controlled rectifier (SCR), a first end of the first SCR being coupled to the utility power source; a third SCR, a second end of the third SCR being coupled to a second end of the first SCR; a fifth SCR, a first end of the fifth SCR being coupled to a second end of the third SCR, a second end of the fifth SCR being coupled to the first end of the third SCR; a first diode, a second end of the first diode being coupled to a first end of the fifth SCR; a first inductor, a first end of the first inductor being coupled to the first end of the fifth SCR; a first power switch element, the first end of the first power switch element being coupled to a second end of the first inductor, and a second end of the first power switch element being coupled to a first end of the first diode; a third power switch element, the second end of the third power switch element being coupled to the second end of the first inductor; a first capacitor, the first end of the first capacitor being coupled to a first end of the third power switch element, a second end of the first capacitor being coupled to the first end of the first diode; a first battery, a first end of the first battery being coupled to a first end of the third SCR; a second SCR, a second end of the second SCR being coupled to the utility power source; a fourth SCR, a first end of the fourth SCR being coupled to a first end of the second SCR, a second end of the fourth SCR being coupled to a second end of the first battery; a sixth SCR, a first end of the sixth SCR being coupled to a second end of the fourth SCR, a second end of the sixth SCR being coupled to the first end of the fourth SCR; a second diode, a first end of the second diode being coupled to the second end of the first battery, a second end of the second diode being coupled to the first end of the first diode; a second power switch element, a first end of the second power switch element being coupled to the second end of the second diode; a second capacitor, a first end of the second capacitor being coupled to the second end of the second diode; a fourth power switch element, a first end of the fourth power switch element being coupled to a second end of the second power switch element, and a second end of the fourth power switch element being coupled to a second end of the second capacitor; and a second inductor, a first end of the second inductor being coupled to the second end of the sixth SCR, and a second end of the second inductor being coupled to the second end of the second power switch element.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
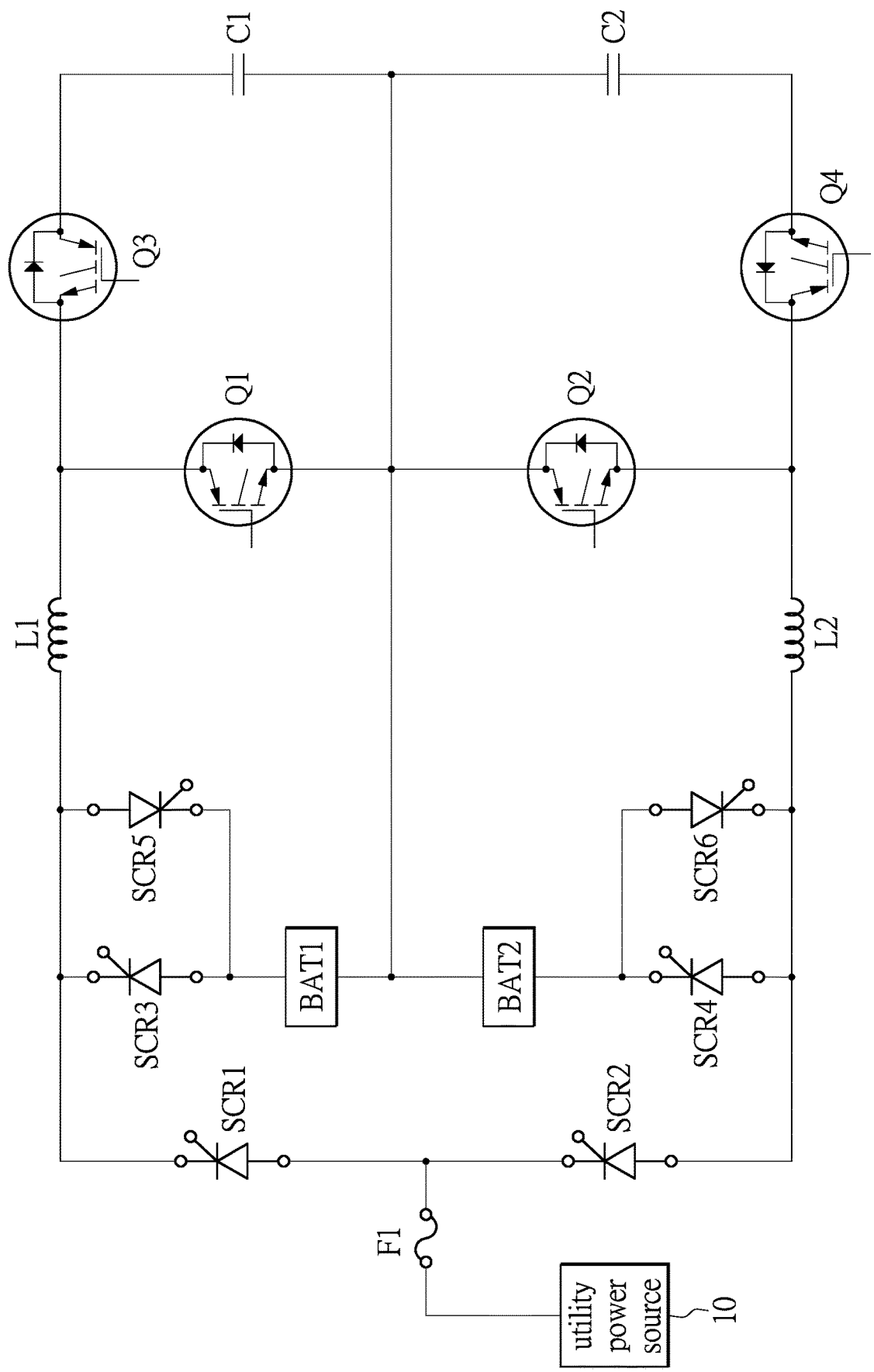
FIG. 1 illustrates a schematic diagram of a connection of a circuit topology in a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

It should be understood that the terminology "switching element" may be used in the disclosure to include multiple power switch components, which refers to an expression term for switching components. However, it is not limited to adapt any one of IGBT, BJT, MOS, CMOS, JFET and MOSFET, or a combination with the functions of the above components. That is, these components should not be limited to the actual product terminologies for such electronic components. In addition, a first to a sixth silicon controlled rectifiers (SCR1~SCR6), a first to a fourth power switch elements (Q1~Q4), a first to a second capacitors (C1~C2), or a first to a second inductors (L1~L2), and so forth. These terms are used to clearly distinguish between one component and another, and it does not indicate a fixed relationship for an order of the components. That is, there may be configurations involving a first switch and a third switch, but excluding a second switch, and the numbers such as "first," "second," or "third," do not impose substantive limitations on the sequence of the components The present disclosure discloses an improved power supply circuit, which is applied to the circuit architecture of a UPS, and does not limit the phase number that is input. That is, the improved power supply circuit is applicable to the circuit architecture configured with single-phase, two-phase or three-phase settings. The present disclosure can be applied not only to the UPS, but also to various rectifiers and charging circuits. The design of the circuit components configured in the present disclosure takes into account that positive and negative half cycles of the utility power source alternate between each other when the pre-stage power factor correction circuit PFC is in operation. Therefore, the design will make full use of an idle half of the power factor correction circuit PFC for performing charging of the battery. The charging related circuit shares some devices and circuit components with the power factor correction circuit PFC, so as to make full use of the devices and circuit components so that a larger charging current can be achieved. At an identical charging current, a higher efficiency in use of energy and energy conservation with reduced carbon emissions, as well as eco-friendliness can be achieved by the improved power supply circuit of the present disclosure, as compared to a conventional power supply circuit.

FIG. 1 illustrates a schematic diagram of a connection of a circuit topology in the present disclosure, which includes a utility power source 10, a plurality of silicon controlled rectifiers (SCR1-SCR6), a first battery BAT1, a second battery BAT2, a first inductor L1, a second inductor L2, a first capacitor C1, a second capacitor C2 and a plurality of power switch elements (Q1~Q4). First ends and second ends of the SCR1-SCR6 will be described in the following. In one embodiment, the first end of each SCR refers to an anode, while the second end of which refers to a cathode (K). If a user defines the first end as the cathode and the second end as the anode, then as long as the respective description regarding the first end and the second end corresponding to FIG. 1 can be reversed, the technical content of the present disclosure is not affected or limited by that disclosed herein. In practice, referring to an end point of an SCR, a third end (i.e., a gate) is further included, and the gate will be connected to a relevant drive circuit and control circuit in the actual circuit manufacture. However, the present disclosure focuses on a circuit topology architecture in the improved power supply circuit of the present disclosure. Details in connection with the gate control circuit of the SCR will not be repeated herein.

With regard to the first ends of the power switch elements (Q1-Q4), the first power switch element Q1 uses an insulated gate bipolar transistor (IGBT) in one embodiment of the present disclosure, but is not limited in the present disclosure In practice, the first power switch element to the fourth power switch element (Q1-Q4) can be a power MOSFET, an IGBT, a BJT, a MOS, a CMOS, a JFET or an IGBT switch module, or a combinational circuit with the functions of the above components. In the IGBT, the first ends of power switch elements (the first to the fourth power switch elements) are all collectors, while the second ends of the power switch elements are all emitters in the embodiment. In addition, if the user defines the first end as the emitter and the second end as the collector, then as long as the respective description regarding the first ends and second ends in the power switch elements (Q1-Q4) corresponding to FIG. 1 can be reversed, the technical content of the present disclosure is not affected or limited by that disclosed herein. In practice, referring to an end point of an IGBT component, a third end (i.e., a gate) is further included, and the gate will be connected to a relevant drive and a control circuit in the actual circuit manufacture. However the present disclosure focuses on a structure of circuit topology in the improved power supply circuit in the present disclosure. Details in connection with the gate control circuit of an IGBT will not be repeated herein.

As shown in FIG. 1, the utility power source 10 and the first end of the first silicon controlled rectifier SCR1 are both coupled to a fuse F1 for protection purposes. The second end of the first silicon controlled rectifier SCR1 is simultaneously coupled to the second end of the third silicon controlled rectifier SCR3 and the first end of the fifth silicon controlled rectifier SCR5. The first end of the third silicon controlled rectifier SCR3 is coupled to the second end of the fifth silicon controlled rectifier SCR5, while the second end of the third silicon controlled rectifier SCR3 is coupled to the first end of the fifth silicon controlled rectifier SCR5. The first end of the first inductor L1 is coupled to the first end of the fifth silicon controlled rectifier SCR5, and the second end of the first inductor L1 is coupled to the first end of the first power switch element Q1. In one embodiment of the present disclosure, the first end of the first inductor L1, as shown in FIG. 1, is the left end of the first inductor L1, and the second end of the first inductor L1 is the right end of the first inductor L1. The first end of the first power switch element Q1 is coupled to the second end of the first inductor L1, the second end of the first power switch element Q1 is coupled to the second end of the first battery BAT1, and the first end of the first battery BAT1 is coupled to the first end of the third silicon controlled rectifier SCR3.

The second end of the third power switch element Q3 is coupled to the second end of the first inductor L1, and the first end of the third power switch element Q3 is coupled to the first end of the first capacitor C1, while the second end of the first capacitor C1 is both coupled to the second end of the first battery BAT1 and the second end of the first power switch element Q1. In one embodiment, the first end of the first capacitor C1 is the upper end of the first capacitor C1 shown in FIG. 1, and the second end of the first capacitor C1 is the lower end of the first capacitor C1. In practice, the first end of the first battery BAT1 can be an anode of a DC, and the second end of the first battery BAT1 can be a cathode.

The second end of the second silicon controlled rectifier SCR2 is coupled to the utility power source 10, and the first end of the second silicon controlled rectifier SCR2 is simultaneously coupled to the first end of the fourth silicon controlled rectifier SCR4 and the second end of the sixth silicon controlled rectifier SCR6. The second end of the fourth silicon controlled rectifier SCR4 is coupled to the first end of the silicon controlled rectifier SCR6 and the second end of the second battery BAT2 simultaneously, while the first end of the second battery BAT2 is coupled to the second end of the first battery BAT1.

The first end of the second power switch Q2 is coupled to the first end of the second battery BAT2, and coupled to the first end of the second capacitor C2. The second end of the second power switch Q2 is coupled to the second end of the second inductor L2, and the first end of the second inductor L2 is coupled to the second end of the sixth silicon controlled rectifier SCR6. The first end of the fourth power switch element Q4 is coupled to the second end of the second power switch element Q2, and the second end of the fourth power switch element Q4 is coupled to the second end of the second capacitor C2.

In one embodiment, the first end of the second capacitor C2 is the upper end of the second capacitor C2 as shown in FIG. 1, and the second end of the second capacitor C2 is the lower end of the second capacitor C2. The first end of the second inductor L2 is the left end of the second inductor L2 as shown in FIG. 1, and the second end of the second inductor L2 is the right end of the second inductor L2. In practice, the first end of the second battery BAT2 can be an anode of a DC, and the second end of the second battery BAT2 can be a cathode.

Through the topology structure of the power supply circuit in the present disclosure, the diode in the pre-stage power factor correction circuit PFC is replaced with a power switch or a power switch element module of active components, such as an IGBT or an IGBT module, or a combinational circuit with the functions of the above components, and two groups of silicon controlled rectifiers are further incorporated. By modifying a power factor correction circuit, appropriately adding a plurality of SCR devices, and the front and rear circuits sharing a first inductor L1 and a second inductor L2, the function and the effect of battery charging and battery discharge in a UPS can be fulfilled. Therefore, costs can be effectively saved, the physical volume can be reduced, the charging current can be easily and flexibly expanded, and the charging capacity and efficiency can be enhanced.

Figure 2:
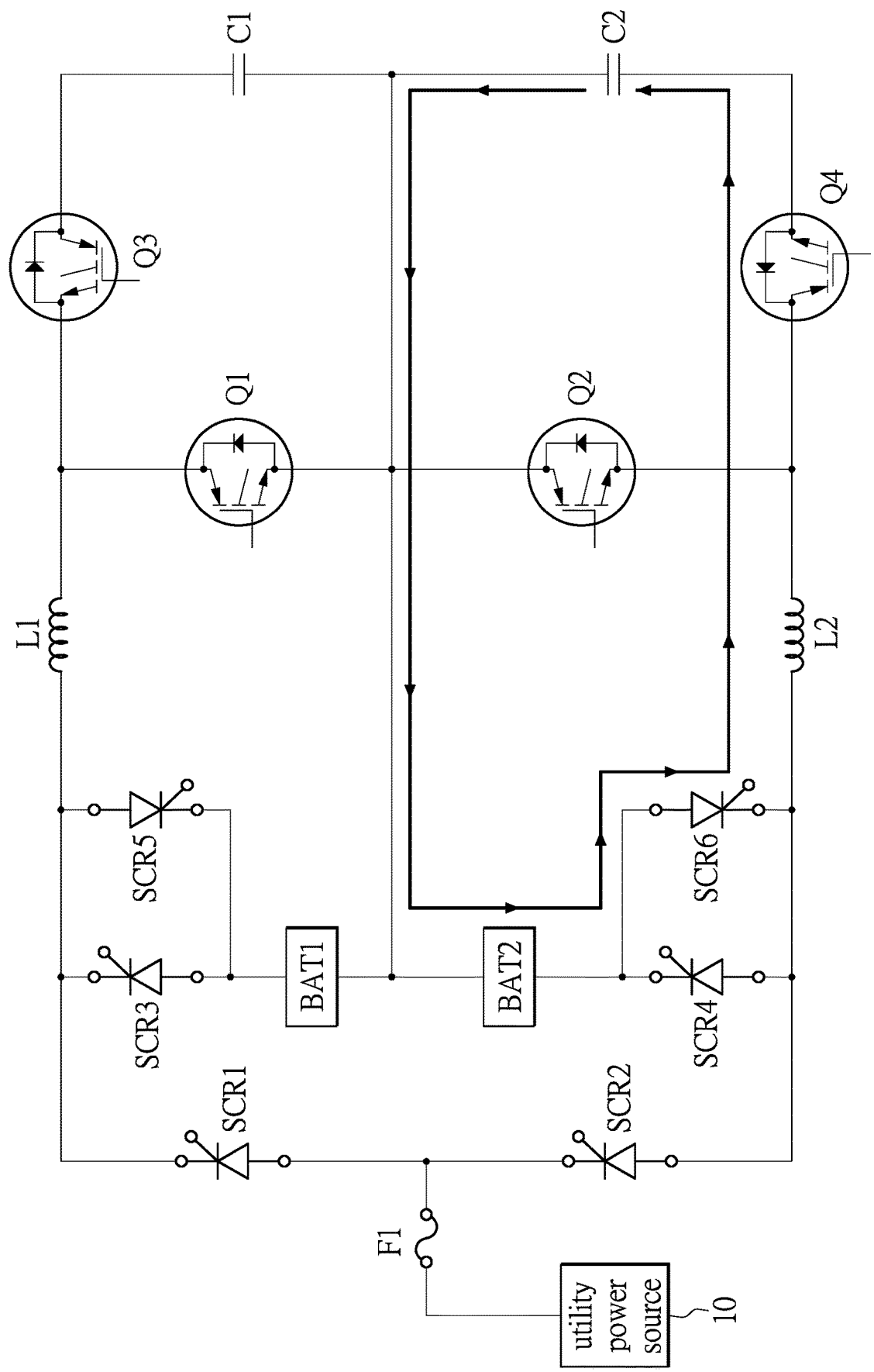
FIG. 2 illustrates a schematic diagram of a second battery being charged in the first embodiment of the present disclosure.
Figure 3:
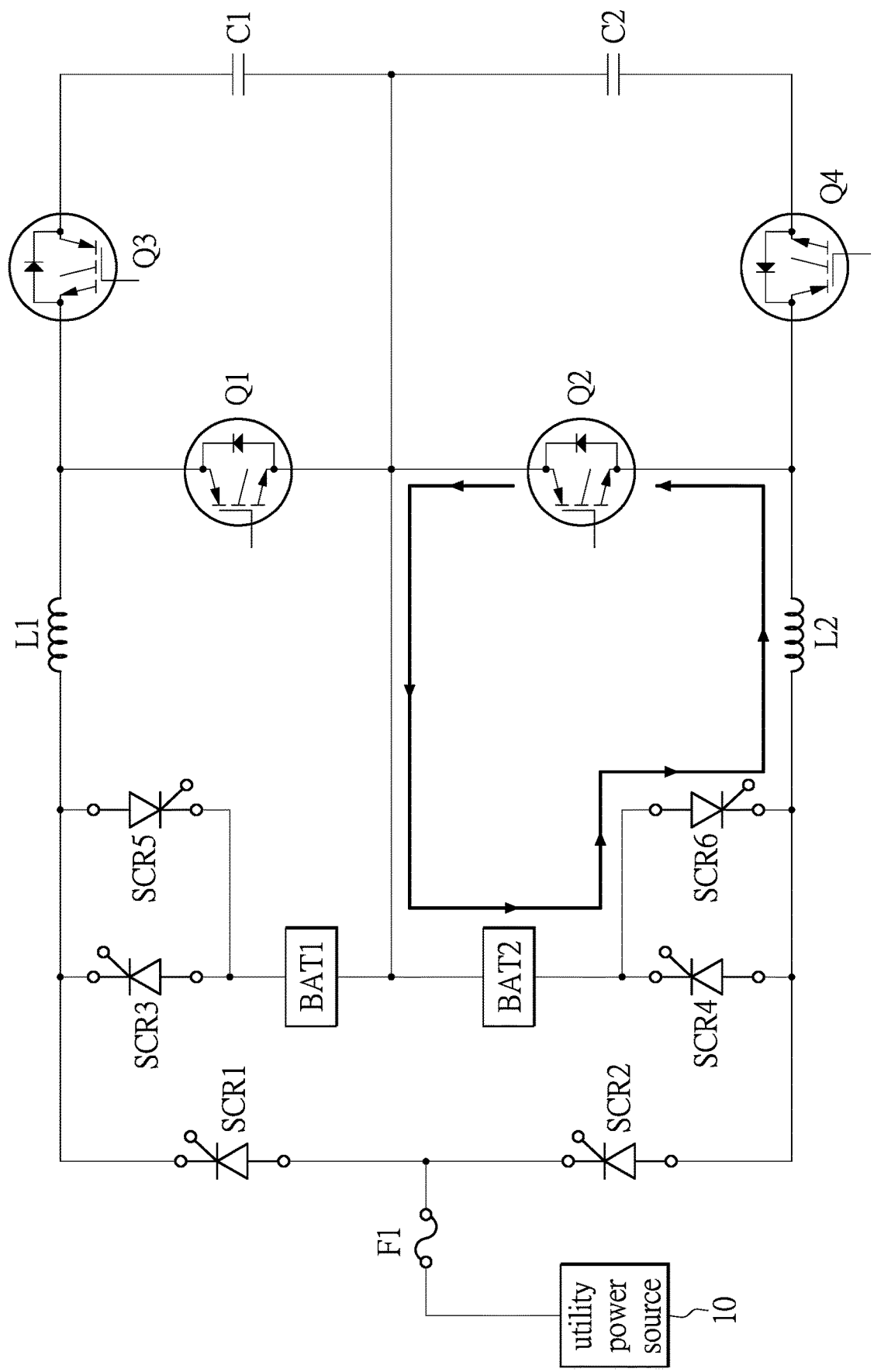
FIG. 3 illustrates a schematic diagram of another charging path of the second battery in the first embodiment of the present disclosure.

Reference is further made to FIGS. 2 and 3, which show the input signal of the utility power source 10 being in a positive half cycle. At this time, the first silicon controlled rectifier SCR1 is turned on, but the third silicon controlled rectifier SCR3 and the fifth silicon controlled rectifier SCR5 are turned off. When the first power switch element Q1 operates, the electrical energy can be directed through a diode of the third power switch element Q3 to the first capacitor C1, so as to maintain the voltage of the first capacitor C1 at a constant value. At the same time, the second silicon controlled rectifier SCR2 and the fourth silicon controlled rectifier SCR4 are turned off, but the sixth silicon controlled rectifier SCR6 is turned on, and the second power switch element Q2 is turned off (disconnected), so that the fourth power switch element Q4 then performs an action.

FIG. 2 illustrates a schematic diagram for charging a second battery in the first embodiment in the present disclosure, which shows the input signal of the utility power source 10 being in a positive half cycle, and the fourth power switch element Q4 being in a turned on state. At this time, a current from the first end of the second capacitor C2 flows into the second battery BAT2, the sixth silicon controlled rectifier SCR6, the second inductor L2 and the fourth power switch element Q4, and so on. The second battery BAT2 is then charged, as shown by the bold line indicating a charging path in FIG. 2, and the second inductor L2 stores the electrical energy.

FIG. 3 illustrates a schematic diagram for another path in charging the second battery in the first embodiment in the present disclosure. As illustrated in FIG. 3, when the input signal of the utility power source 10 is in a positive half cycle and the fourth power switch element Q4 is turned off (disconnected), the amount of electrical energy stored in the second inductor L2 is released and a current direction on the second inductor L2 does not change. As illustrated by the bold line in FIG. 3, a current continues to pass through the second inductor L2, the second power switch element Q2, the second battery BAT2, the sixth SCR and so forth, so as to charge the second battery BAT2. At this time, a manner of operation pertaining to that of a buck circuit is formed, which makes use of a diode of the second power switch element Q2 based on flyback diode principle.

On the other hand, since the signals of the positive and negative half cycles of the utility power source 10 are symmetrical, when the input voltage is in a negative half cycle, the working principle is similar to the case where the input voltage is in a positive half cycle. That is, the first battery BAT1 will be charged, and details in connection with said working principle will not be repeated herein.

From the above, the charging circuit in the present disclosure is integrated with the power factor correction circuit PFC, and the idle half of the power factor correction circuit PFC is used to perform charging. Since the power of the power factor correction circuit PFC is very large and the device capacity is sufficient, the charging current can be easily provided and the heat dissipation can be ensured, so that the actual circuit can realize a rated capacity for charging current in the UPS. At the same time, since a thick wire is adopted as the copper wire of the inductor, and the copper foil of the power factor correction circuit PFC is also a thick wire, the efficiency for charging will be greatly improved.

Figure 4:
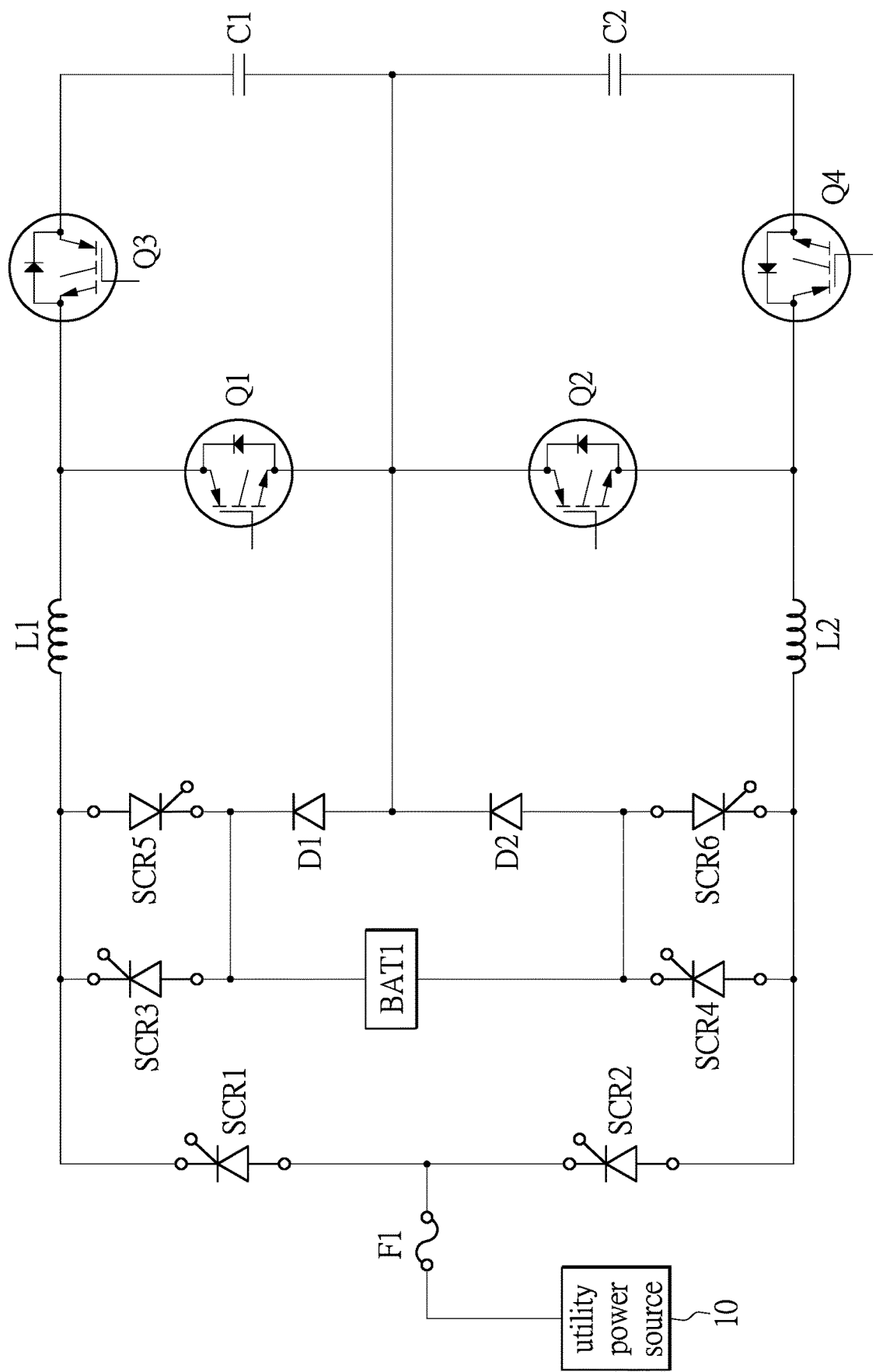
FIG. 4 illustrates a schematic diagram of a connection of a circuit topology in a second embodiment of the present disclosure.

FIG. 4 illustrates a schematic diagram for a connection of the circuit topology of a second embodiment in the present disclosure, which is a circuit used for charging a single-battery by adding two diodes. In practice, the user of the circuit architecture, or the designer of the UPS circuit, may choose from a battery mode with the dual-battery pack in the first embodiment, or a battery mode with the single-battery pack in the second embodiment according to practical requirements, and the present disclosure is not limited thereto.

The improved power supply circuit illustrated in FIG. 4 is also used in a UPS circuit. A structure of circuit topology in the improved power supply circuit in the second embodiment includes: a utility power source 10, a plurality of silicon controlled rectifiers (SCR1-SCR6), the first battery BAT1 with only one set of batteries, a first inductor L1, a second inductor L2, a first capacitor C1, a second capacitor C2, a plurality of power switch elements (Q1~Q4), and a first diode D1 and a second diode D2. The first end of the first silicon controlled rectifier SCR1 is coupled to the utility power source 10. In one embodiment, the utility power source 10 and the first end of the first silicon controlled rectifier SCR1 are both coupled to a fuse F1 for protection purposes. The second end of the third silicon controlled rectifier SCR3 is coupled to the second end of the first silicon controlled rectifier SCR1. The first end of the fifth silicon controlled rectifier SCR5 is coupled to the second end of the third silicon controlled rectifier SCR3, and the second end of the fifth silicon controlled rectifier SCR5 is coupled to the first end of the third silicon controlled rectifier SCR3. The second end (cathode) of the first diode D1 is coupled to the first end of the fifth silicon controlled rectifier SCR5. The first end of the first inductor L1 is coupled to the first end of the fifth silicon controlled rectifier SCR5.

The first end of the first power switch element Q1 illustrated in FIG. 4 is coupled to the second end of the first inductor L2, while the second end of the first power switch element Q1 is coupled to the first end of the first diode D1 (anodes). The second end of the third power switch element Q3 is coupled to the second end of the first inductor L1, the first end of the first capacitor C1 is coupled to the first end of the third power switch element Q3, and the second end of the first capacitor C1 is coupled with the first end (anode) of the first diode D1. The first end of the first battery BAT1 is coupled to the first end of the third silicon controlled rectifier SCR3. The second end of the second silicon controlled rectifier SCR2 is coupled to the utility power source 10. The first end of the fourth silicon controlled rectifier SCR4 is coupled to the first end of the second silicon controlled rectifier SCR2, while the second end of the fourth silicon controlled rectifier SCR4 is coupled to the second end of the first battery BAT1. The first end of the sixth silicon controlled rectifier SCR6 is coupled to the second end of the fourth silicon controlled rectifier SCR4, while the second end of the silicon controlled rectifier SCR6 is coupled to the first end of the fourth silicon controlled rectifier SCR4.

In addition, the first end (anode) of the second diode D2 is coupled to the second end of the first battery BAT1, while the second end (cathode) of the second diode D2 is coupled to the first end of the first diode D1 (anode). The first end of the second power switch Q2 is coupled to the second end of the second diode D2, and the first end of the second capacitor C2 is coupled to the second end of the second diode D2. The first end of the fourth power switch element Q4 is coupled to the second end of the second power switch element Q2, and the second end of the fourth power switch element Q4 is coupled to the second end of the second capacitor C2. The first end of the second inductor L2 is coupled to the second end of the sixth silicon controlled rectifier SCR6, while the second end of the second inductor L2 is coupled to the second end of the second power switch element Q2. In this way, the circuit topology architecture of the single-battery pack in the second embodiment of the present disclosure is completed.

As illustrated in FIG. 4, the difference between FIG. 1 and FIG. 4 is the addition of the first diode D1 and the second diode D2. When the input of the utility power source 10 is in the wave of a positive half cycle, the first silicon controlled rectifier SCR1 is turned on (forming a closed circuit), the third silicon controlled rectifier SCR3 and the fifth silicon controlled rectifier SCR5 are turned off (forming an open circuit), and the first power switch element Q1 performs an action, the amount of the electrical energy is transmitted to the first capacitor C1 through the diode of the third power switch element Q3, thereby maintaining the voltage of the first capacitor C1 at a constant value. At the same time, the second silicon controlled rectifier SCR2 and the fourth silicon controlled rectifier SCR4 is turned off (forming an open circuit), the sixth silicon controlled rectifier SCR6 is turned on (forming a closed circuit), the second power switch element Q2 is turned off, and the fourth power switch element Q4 performs the action, so that a current flowing through the second inductor L2 passes through the first diode D1 and charges the first battery BAT1.

Figure 5:
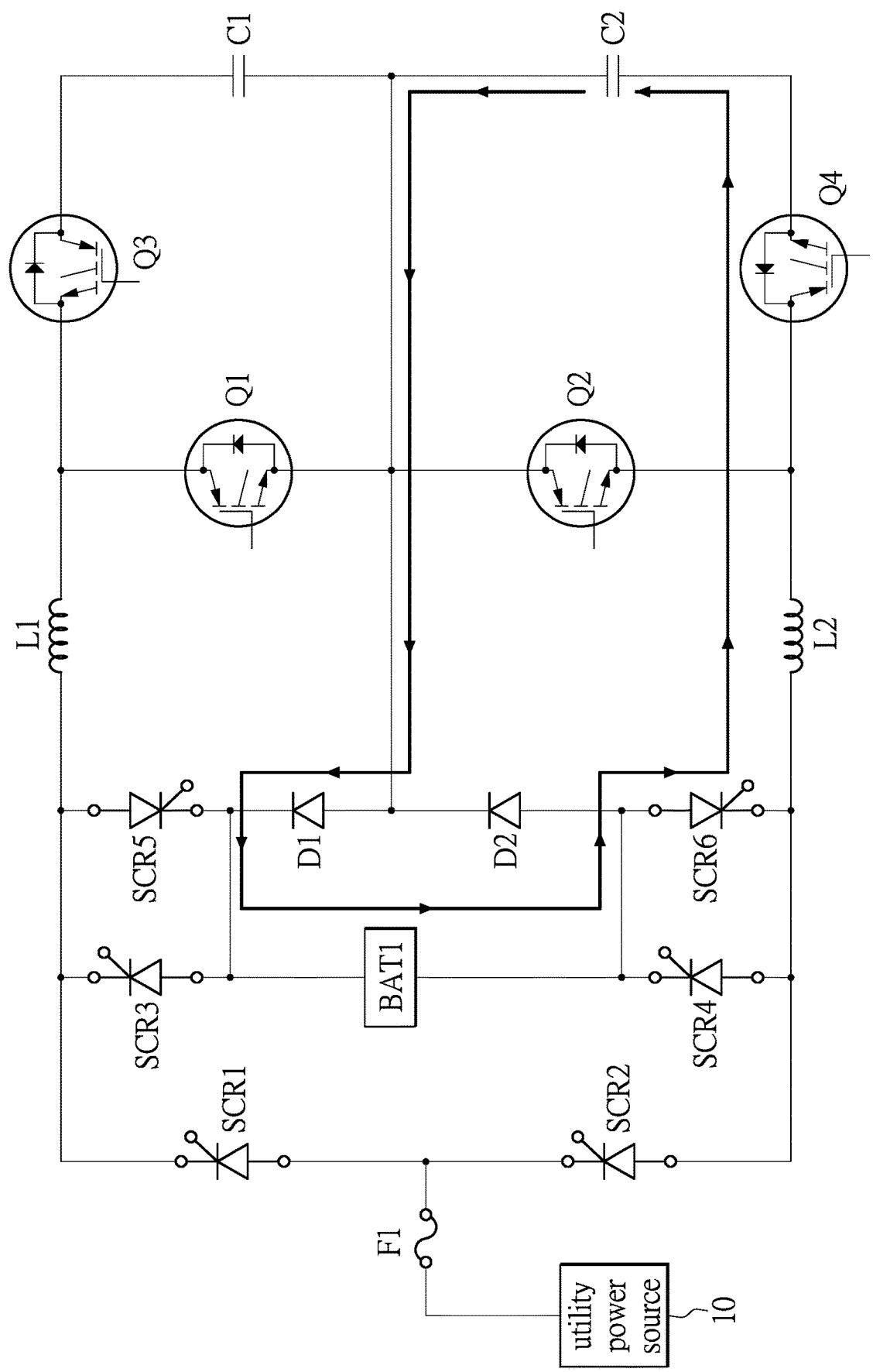
FIG. 5 illustrates a schematic diagram of a first battery being charged in the second embodiment of the present disclosure.

As illustrated in FIG. 5, when the input of the utility power source 10 is in a positive half cycle and the fourth power switch element Q4 is turned on (forming a closed circuit), the current flows from the first end of the second capacitor C2 to the first diode D1, the first battery BAT1, the sixth silicon controlled rectifier SCR6, the second inductor L2, and the fourth power switch element Q4, so as to charge the first battery BAT1, as shown in a path indicated by the bold line in FIG. 5, while the second inductor L2 stores electrical energy.

Figure 6:
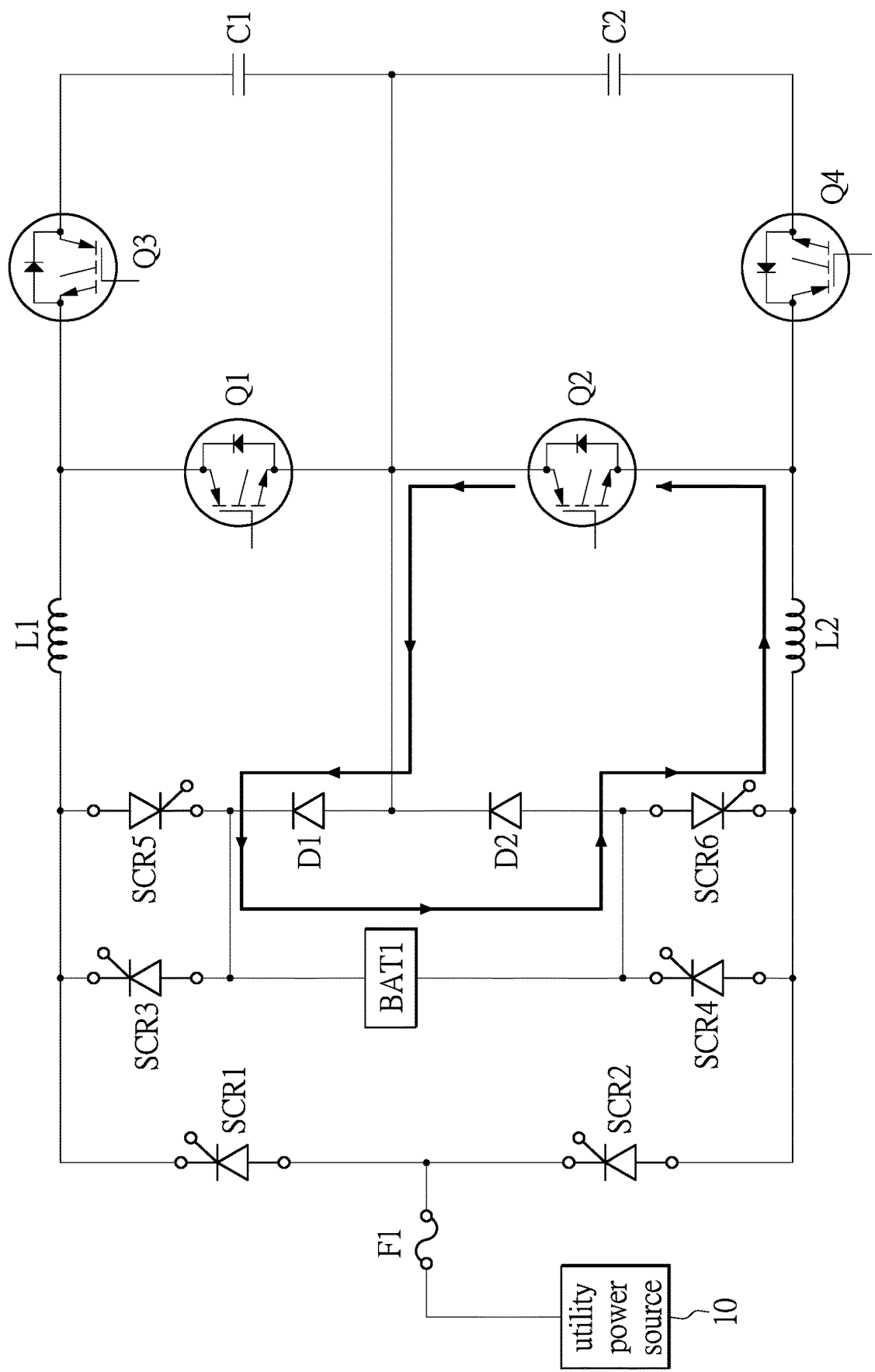
FIG. 6 illustrates a schematic diagram of another charging path of the first battery in the second embodiment of the present disclosure.

FIG. 6 illustrates a schematic diagram for another path in charging the first battery in the second embodiment of the present disclosure. As illustrated in FIG. 6, when the input of the utility power source 10 is still in the positive half cycle, and the fourth power switch element Q4 is turned off, the electrical energy stored on the second inductor L2 will be released. Since the current direction cannot be suddenly changed, the current continues to pass through the second inductor L2, the second power switch element Q2, the first diode D1, the first battery BAT1, the sixth SCR and so forth, so as to charge the first battery BAT1. At this point, using the principle relating to a diode of the second power switch element Q2, a manner of operation similar to that of a buck circuit is formed. By virtue of the addition of diodes in the second embodiment, the current can be guided to charge the single-battery.

In the second embodiment, because the signals of the positive and negative half cycles of the utility power source 10 are symmetrical, when the input voltage is in a negative half cycle, the working principle is similar to the case where the input voltage is in a positive half cycle. That is, the first battery BAT1 will be charged, and details in connection with said working principle will not be repeated herein.

The present disclosure provides an improved power supply circuit by adjusting components of the topology architecture and circuit devices. Using the alternating characteristic of waves of the positive and negative half cycles of the utility power source 10, an idle half of the circuit topology architecture can be used. To charge the architecture of a single-battery pack or dual-battery pack, the charging part of the circuit topology architecture and the power factor correction circuit of the topology architecture can share some of the circuit devices, so as to make full use of the circuit devices, and to achieve the purpose of a larger charging current. Therefore, a higher efficiency can be achieved under the premise of an identical charging current, so that a more efficient use of energy and energy conservation with reduced carbon emissions are possible.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power supply circuit, which is used in an uninterruptible power supply system for single-phase, two-phase or three-phase circuits, the power supply circuit comprises: a utility power source; a first silicon controlled rectifier (SCR), a first end of the first SCR being coupled to the utility power source; a third SCR, a second end of the third SCR being coupled to a second end of the first SCR; a fifth SCR, a first end of the fifth SCR being coupled to a second end of the third SCR, a second end of the fifth SCR being coupled to the first end of the third SCR; a first battery, a first end of the first battery being coupled to a first end of the third SCR; a first inductor, a first end of the first inductor being coupled to the first end of the fifth SCR; a first power switch element, a first end of the first power switch element being coupled to a second end of the first inductor, and a second end of the first power switch element being coupled to a second end of the first battery; a third power switch element, a second end of the third power switch element being coupled to the second end of the first inductor; a first capacitor, a first end of the first capacitor being coupled to a first end of the third power switch element, a second end of the first capacitor being coupled to the second end of the first battery; a second SCR, a second end of the second SCR being coupled to the utility power source; a fourth SCR, a first end of the fourth SCR being coupled to a first end of the second SCR; a sixth SCR, a first end of the sixth SCR being coupled to a second end of the fourth SCR, a second end of the sixth SCR being coupled to the first end of the fourth SCR; a second battery, a first end of the second battery being coupled to the second end of the first battery, a second end of the second battery being coupled to the second end of the fourth SCR; a second power switch element, a first end of the second power switch element being coupled to the first end of the second battery; a second capacitor, a first end of the second capacitor being coupled to the first end of the second battery; a fourth power switch element, a first end of the fourth power switch element being coupled to a second end of the second power switch element, and a second end of the fourth power switch element being coupled to a second end of the second capacitor; and a second inductor, a first end of the second inductor being coupled to the second end of the sixth SCR, and a second end of the second inductor being coupled to the second end of the second power switch element, wherein when an input of the utility power source is in a positive half cycle, the first SCR is turned on, the third SCR and the fifth SCR are turned off, the first power switch element is turned on, an electrical energy is transmitted to the first capacitor through a diode of the third power switch element to maintain a voltage of the first capacitor at a constant value; meanwhile, the second SCR and the fourth SCR are turned off, the sixth SCR is turned on, the second power switch element is turned off, and the fourth power switch element is turned on.

2. The power supply circuit as claimed in claim 1, wherein when the input of the utility power source is in the positive half cycle and the fourth power switch element is turned on, a current flows from the first end of the second capacitor and passes through the second battery, the sixth SCR, the second inductor and the fourth power switch element so as to charge the second battery, and the second inductor stores the electrical energy; when the input of the utility power source is also in the positive half cycle and the fourth power switch element is turned off, the electrical energy stored in the second inductor is released, and the current continues to pass through the second inductor, the second power switch element, the second battery and the sixth SCR, so as to charge the second battery.

3. The power supply circuit as claimed in claim 1, wherein the first ends of SCRs are all anodes and the second ends of all the SCRs are all cathodes; the first ends of all power switch elements are all collectors while all the second ends of power switch elements are all emitters.

4. The power supply circuit as claimed in claim 1, wherein the first power switch element to the fourth power switch element can be a power MOSFET, an IGBT, a BJT, a MOS, a CMOS, a JFET or an IGBT switch module.

5. A power supply circuit, which is used in an uninterruptible power supply (UPS) for single-phase, two-phase or three-phase circuits, the power supply circuit comprises:
a utility power source;
a first silicon controlled rectifier (SCR), a first end of the first SCR being coupled to the utility power source;
a third SCR, a second end of the third SCR being coupled to a second end of the first SCR;
a fifth SCR, a first end of the fifth SCR being coupled to a second end of the third SCR, a second end of the fifth SCR being coupled to the first end of the third SCR;
a first diode, a second end of the first diode being coupled to a first end of the fifth SCR;
a first inductor, a first end of the first inductor being coupled to the first end of the fifth SCR;
a first power switch element, a first end of the first power switch element being coupled to a second end of the first inductor, and a second end of the first power switch element being coupled to a first end of the first diode;
a third power switch element, a second end of the third power switch element being coupled to the second end of the first inductor;
a first capacitor, a first end of the first capacitor being coupled to a first end of the third power switch element, a second end of the first capacitor being coupled to the first end of the first diode;
a first battery, a first end of the first battery being coupled to a first end of the third SCR;
a second SCR, a second end of the second SCR being coupled to the utility power source;
a fourth SCR, a first end of the fourth SCR being coupled to a first end of the second SCR, a second end of the fourth SCR being coupled to a second end of the first battery;
a sixth SCR, a first end of the sixth SCR being coupled to a second end of the fourth SCR, a second end of the sixth SCR being coupled to the first end of the fourth SCR;
a second diode, a first end of the second diode being coupled to the second end of the first battery, a second end of the second diode being coupled to the first end of the first diode;
a second power switch element, a first end of the second power switch element being coupled to the second end of the second diode;
a second capacitor, a first end of the second capacitor being coupled to the second end of the second diode;
a fourth power switch element, a first end of the fourth power switch element being coupled to a second end of the second power switch element, and a second end of the fourth power switch element being coupled to a second end of the second capacitor; and
a second inductor, a first end of the second inductor being coupled to the second end of the sixth SCR, and a second end of the second inductor being coupled to the second end of the second power switch element.

6. The power supply circuit as claimed in claim 5, wherein when an input of the utility power source is in a positive half cycle, the first SCR is turned on, the third SCR and the fifth SCR are turned off, the first power switch element is turned on, an electrical energy is transmitted to the first capacitor through a diode of the third power switch element to maintain a voltage of the first capacitor at a constant value; meanwhile, the second SCR and the fourth SCR are turned off, the sixth SCR is turned on, and the second power switch element is turned off, the fourth power switch element is turned on, so that a current flowing through the second inductor passes through the first diode and charges the first battery.

7. The power supply circuit as claimed in claim 6, wherein when the input of the utility power source is in the positive half cycle and the fourth power switch element is turned on, a current flows from the first end of the second capacitor, and passes through the first diode, the first battery, the sixth SCR, the second inductor and the fourth power switch element so as to charge the second battery, and the second inductor stores the electrical energy; when the input of the utility power source is also in the positive half cycle and the fourth power switch element is turned off, the electrical energy stored in the second inductor is released, and the current continues to pass through the second inductor, the second power switch element, the first diode, the first battery and the sixth SCR, so as to charge the first battery.

8. The power supply circuit as claimed in claim 6, wherein the first ends of all SCRs are all anodes and the second ends of all the SCRs are all cathodes; the first ends of the first and second diodes are both anodes and the second ends of the first and second diodes are both cathodes; the first ends of all power switch elements are all collectors, while the second ends of all the power switch elements are all emitters.

9. The power supply circuit as claimed in claim 5, wherein the first to the fourth power switch elements can be a power MOSFET, an IGBT, a BJT, a MOS, a CMOS, a JFET or an IGBT switch module.

* * * * *